Feb. 17, 1970 J. K. HASPERT 3,495,774
FLUERIC SQUARING CIRCUIT
Filed Jan. 19, 1968 2 Sheets-Sheet 1
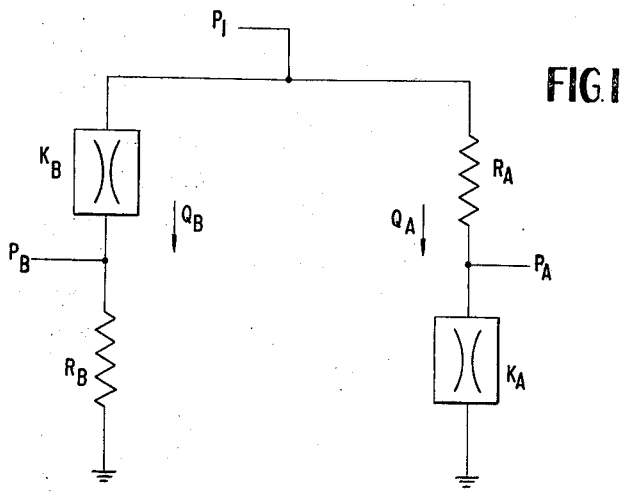
FIG. 1
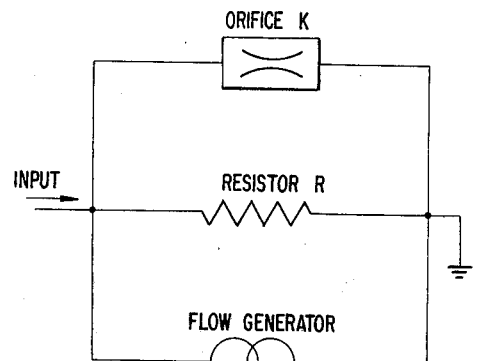
FIG. 4
FIG. 2
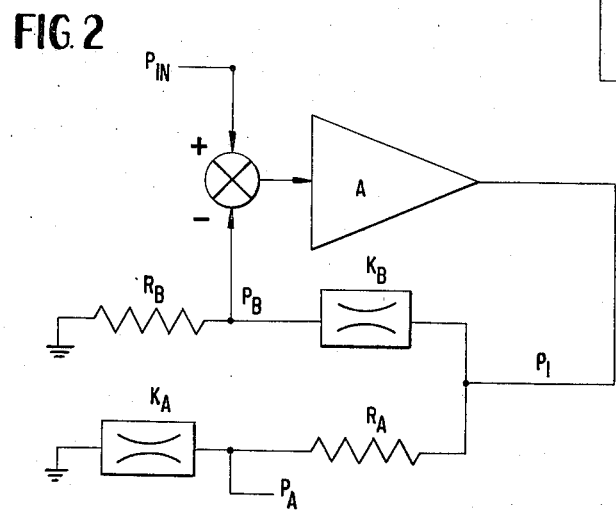
FIG. 3
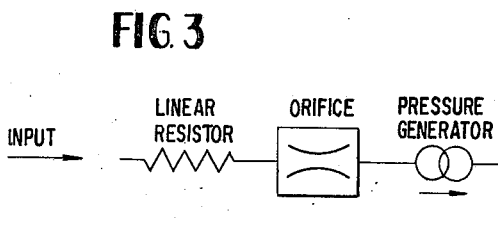
INVENTOR
JULIAN KENT HASPERT
BY Harry M. Saragovitz,
Edward J. Kelly, Herbert Berl
& Gerald L. Lett
ATTORNEYS Feb. 17, 1970   J. K. HASPERT   3,495,774
FLUERIC SQUARING CIRCUIT
Filed Jan. 19, 1968   2 Sheets-Sheet 2

INVENTOR
JULIAN KENT HASPERT

United States Patent Office 3,495,774
Patented Feb. 17, 1970

3,495,774
FLUERIC SQUARING CIRCUIT
Julian Kent Haspert, Greenbelt, Md., assignor to the United States of America as represented by the Secretary of the Army
Filed Jan. 19, 1968, Ser. No. 699,226
Int. Cl. G06d 1/00; G06m 1/16
U.S. Cl. 235—200                              4 Claims

ABSTRACT OF THE DISCLOSURE

A flueric squaring circuit using a bridge comprising fluid resistance means and orifice means to derive one pressure proportional to the square of another. A fluid pressure amplifier is connected in a feedback arrangement to cause the output pressure to be proportional to the square of the input pressure. A compensating system for causing the input impedance of an amplifier to appear as a linear fluid resistance is shown for use in the circuit.

BACKGROUND OF THE INVENTION

Field of the invention

This invention relates to a flueric analog computer and more particularly to a flueric squaring circuit which produces an output fluid pressure proportional to the square of an input fluid pressure.

DESCRIPTION OF THE PRIOR ART

Flueric squarers have been attempted in the prior art through the direct use of squaring phenomenon and through the use of a nonlinear fluid resistance fed-back around a flueric amplifier.

SUMMARY OF THE INVENTION

One object of the invention is to provide a more flueric squaring circuit.

Another object of the invention is to provide a flueric squaring circuit for use in a flueric quartersquare multiplier.

Another object of the invention is to provide a flueric squaring circuit using a flueric amplifier having a linear input resistance.

BRIEF DESCRIPTION OF THE DRAWINGS

FIGURE 1 is a schematic diagram illustrating a flueric bridge circuit for producing one output having a pressure proportional to the pressure of the other output.

FIGURE 2 is a schematic diagram illustrating a modification of the bridge circuit of FIGURE 1 to include a flueric amplifier having the bridge circuit in its feedback path.

FIGURE 3 is a schematic diagram illustrating the series input impedance of a typical flueric amplifier.

FIGURE 4 is a schematic diagram illustrating the parallel equivalent of the impedance in FIGURE 3.

DESCRIPTION OF THE PREFERRED EMBODIMENTS

Figure 6:
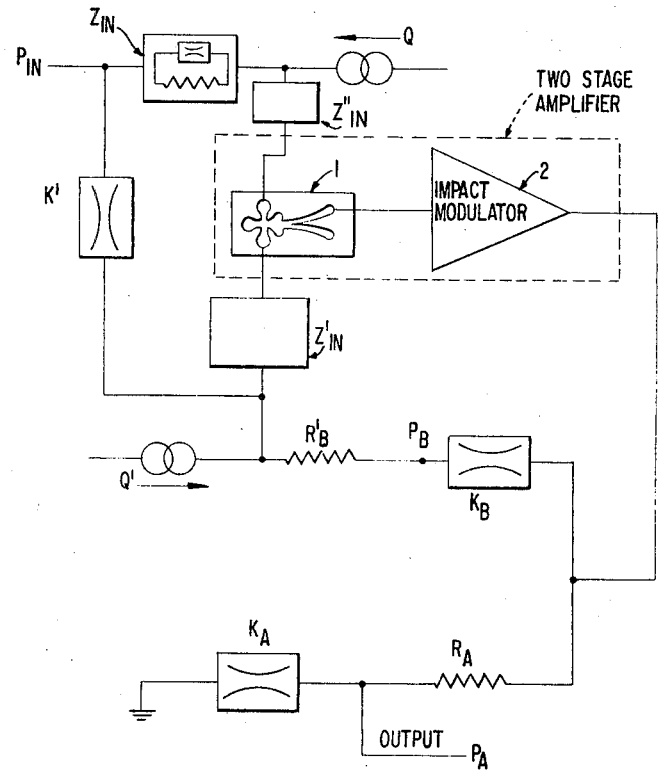
FIGURE 6 shows the preferred embodiment of the flueric squaring circuit.

Flueric resistors, illustrated in the figures by the same symbols as are used for conventional electrical resistors, are usually capillary tubes, which allow fluid flow proportional to pressure drop. Orifices, also shown in the figures, cause a pressure drop proportional to the square of fluid flow through the orifice. Thus an orifice has a non-linear resistive impedance.

In FIGURE 1 there is illustrated a flueric bridge circuit. A pressure $P_1$ is applied between the junction of resistor $R_A$ with orifice $K_B$ and atmospheric or common pressure, illustrated by the symbol for ground connection. The resistances of $R_A$ and of $R_B$ are equal and will be called R. The impedances of orifices $K_A$ and $K_B$ are equal and will be called K. $P_A$ is the pressure drop across orifice $K_A$, and $P_B$ is the drop across resistance $R_B$. $Q_A$ is the fluid current through $R_A$ and $K_A$, and $Q_B$ is the fluid current through $R_B$ and $K_B$.

When the circuit is analyzed as follows, it is found that $P_A$ is proportional to $P_B^2$.

$$P_A = KQ_A^2$$
$$P_B = RQ_B$$

Define $Z_A$ as the series impedance of $R_A$ and $K_A$, and $Z_B$ as that of $R_B$ and $K_B$.
$Q_A = Q_B$ because $$Z_A = \frac{P_1}{Q_A} = \frac{R_A Q_A + K_A Q_A^2}{Q_A} = R_A + K_A Q_A$$

$$Z_B = \frac{P_1}{Q_B} = \frac{R_B Q_B + K_B Q_B^2}{Q_B} = R_B + K_B Q_B$$

$$P_1 = Z_B Q_B = Z_A Q_A$$

$$Z_A = Z_B$$

$$\therefore Q_A = Q_B \text{ (now called } Q\text{)}$$

Since $Q = \frac{P_1 - P_A}{R}$ and $P_A = KQ^2$ then $$P_A = \frac{K}{R^2}(P_1^2 - 2P_1 P_A + P_A^2)$$

Because the pressure drop is the same across both resistors, then $P_B = P_1 - P_A$
Quadratic solution yields:

$$P_A = \frac{2P_1 + \frac{R^2}{K} \pm \sqrt{\frac{4P_1 R^2}{K} + \frac{R^4}{K^2}}}{2}$$

$$P_B = \frac{-\frac{R^2}{K} \pm \sqrt{\frac{4P_1 R^2}{K} + \frac{R^4}{K^2}}}{2}$$

Squaring $P_B$ gives $$P_B^2 = \frac{R^2}{K}\left[\frac{2P_1 + \frac{R^2}{K} \pm \sqrt{\frac{4P_1 R^2}{K} + \frac{R^4}{K^2}}}{2}\right]$$

which demonstrates that $$P_B^2 = \frac{R^2 P_A}{K}$$

or that $P_B^2$ is proportional to $P_A$.

A flueric squaring circuit including the bridge circuit of FIGURE 1 is illustrated in FIGURE 2. The amplifiers used in this invention (for example, amplifier A of FIGURE 2) are conventional flueric amplifiers. The Corning .010″ x .020″ proportional amplifier is an example of a suitable amplifier.

In FIGURE 2, amplifier A, which is diagrammatically illustrated as a single amplifier stage but may in practice be a plurality of cascaded amplifier stages, is connected as a high gain summing amplifier with the bridge circuit in a feedback loop around the amplifier. The output pressure $P_1$ from amplifier A will be adjusted by feedback through the bridge to cause $P_B$ to become substantially equal to the input pressure $P_{IN}$. Thus, from previously derived equations, $$P^2_{IN} = \frac{R^2 P_A}{K}$$

Due to the high gain of the amplifier A, the fluid flow from the junction of $K_B$ and $R_B$ required to balance the input fluid flow will be small.

Although the circuit of FIGURE 2 is useful as a squarer, there will be some inherent noise or error because of the gain required for the feedback loop. By making the bridge circuit of higher impedance it would be possible to reduce this noise. But raising the bridge impedance requires an amplifier with a more linear input impedance than is currently available. A low impedance bridge circuit will compensate for the nonlinearities of the amplifier input. Accordingly, a compensation circuit has been designed to improve the linearity of the input impedance, and is shown used in FIGURE 6.

FIGURE 3 shows the equivalent impedance of the input circuit of a flueric amplifier which must be corrected by the compensation circuit. The pressure generator is the result of entrainment of fluid when the power jet is turned on. The orifice and linear resistor are typical of most fluid amplifiers. Because it is difficult to do the necessary calculations from this circuit, an "equivalent" parallel circuit as shown in FIGURE 4 is used. In the parallel circuit, the pressure generator is replaced by a flow generator. The equivalent circuit with the elements in parallel gives a good approximation of the series circuit. Both of the circuits shown in FIGURES 3 and 4 are only models of the input impedance of a flueric amplifier. None of the circuit elements shown in these figures exist as separate and distinct elements apart from the amplifier.

To make the input impedance linear, the effects of the orifice and of the flow generator must be cancelled. If flow is introduced through a large resistance from a high pressure source, the effect of the generator may be easily cancelled. This is illustrated diagrammatically as the flow generator $Q'$ shown in FIGURE 6. Thus, the effects of the flow generator of the equivalent circuit shown in FIGURE 4 are cancelled, but the input impedance of the flueric amplifier is still nonlinear. To correct this, the nonlinear effects of the orifice of the equivalent circuit shown in FIGURE 4 must be cancelled.

Figure 5:
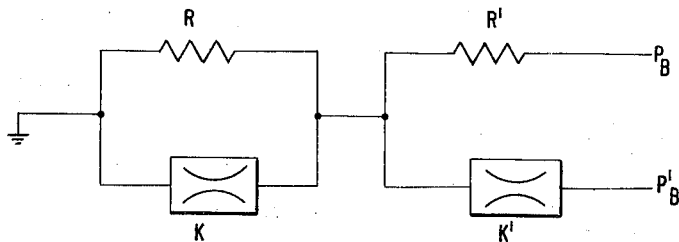
FIGURE 5 is a schematic diagram illustrating the effect of orifice compensation in the circuit of FIGURE 4.

The circuit of FIGURE 5 illustrates the elimination of the nonlinear effects of the orifice on the input impedance. In that circuit if a resistor $R'$ of equal value to the inherent input resistance R is added in series with R in the $P_B$ input circuit and if a series orifice $K'$ of equal value to the inherent orifice K is added in series with K in the $P_B'$ input circuit, and if $P_B = P_B'$, then the input impedance seen by input $P_B$ is linear. This may be understood when it is realized that the total fluid flow through the parallel combination of R and K is made up of a linear flow through R and a nonlinear flow through K. Thus, the combined fluid flow from the compensating elements $R'$ and $K'$ must be equal to the total fluid flow through the parallel combination of R and K. If the fluid flow through $K'$ is equal to the nonlinear flow through K, then flow through $R'$ is linear. This, of course, is assured by the choice of $R'$ equal to R, $K'$ equal to K and $P_B$ equal to $P_B'$. This circuit requires an extra input signal source, independent of the bridge, to supply a pressure $P_B'$ equal to $P_B$. In this invention, the extra input pressure signal is available as $P_{IN}$ as shown in FIGURE 2. $P_{IN}$ substantially equals $P_B$ when the system reaches a steady state condition.

FIGURE 6 shows the preferred embodiment of the disclosed squarer. Amplifier 1 can be the HDL proportional fluid amplifier, developed at the Harry Diamond Laboratories in Washington, D.C., and now well known. Impact modulator 2 is a high negative-gain fluid amplifier and can be of the well-known type made by the Johnson Service Company. Other fluid amplifiers could be used as appropriate.

Impedances $Z'_{IN}$ and $Z''_{IN}$ are the input impedances of amplifier 1 and are illustrated external to the amplifier. The elements of impedances $Z'_{IN}$ and $Z''_{IN}$ are illustrated in more detail in FIGURE 4. Regulated flows Q and $Q'$ come from a constant pressure source. Q compensates for the fluid generator of $Z''_{IN}$ and $Q'$ compensates for the fluid generator of $Z'_{IN}$. $R'_B$ is the same as $R'$, and $K'$ is the same as $K'$ in FIGURE 5. Because the impedance on the input side need not be linearized, the orifice of $Z''_{IN}$ can be compensated for by an orifice contained in compensating impedance $Z_{IN}$. Compensating impedance $Z_{IN}$ also contains a resistive element to compensate for the inherent resistance in $Z''_{IN}$. $R_A$, $R_B'$, $K_A$ and $K_B$ have equivalent functions to the elements of FIGURES 1 and 2, except that $R_B'$ is smaller than $R_B$ from those figures. $R'_B$ is smaller because the resistance of $Z'_{IN}$, in series with $R_B'$, makes the series total resistance equivalent to $R_B$. The circuit works as was explained for FIGURE 2, except that part of the resistance from orifice $K_B$ to atmospheric pressure is an inherent part of the amplifier.

The circuit of FIGURE 6 operates to receive an input pressure $P_{IN}$ and to generate an output pressure $P_A$ proportional to the square of $P_{IN}$. $P_{IN}$ is applied to input impedance $Z_{IN}$. The output current from $Z_{IN}$, as compensated by current Q, enters the upper input channel of fluid amplifier 1 through inherent input impedance $Z''_{IN}$, is amplified in amplifiers 1 and 2 and appears as an amplified pressure $P_1$ at the junction of orifice $K_B$ and resistor $R_A$ as shown in FIGURE 1.

A current $Q_B$, shown in FIGURE 1, passes through $K_B$ causing pressure $P_B$ at the outlet of $K_B$. In FIGURE 6, pressure $P_B$ forces a current through $R'_B$. This current is compensated by current $Q'$, and enters the lower input channel of amplifier 1 through inherent input impedance $Z'_{IN}$. Because the two-stage amplifier consisting of amplifiers 1 and 2 has high gain, the system is unbalanced until the pressures at the two inputs of amplifier 1 are nearly equal. The feedback from the bridge circuit causes the system to approach the balanced condition. When the system is balanced, $P_B$ is proportional to $P_{IN}$. Because of the previously explained characteristics of the bridge circuit, $P_A$ is proportional to $P_B^2$.

Therefore, in the circuit according to FIGURE 6, the output pressure $P_A$ will be substantially proportional to the square of input pressure $P_{IN}$.

By reversing the connections of the bridge circuit to the amplifier, this circuit can also be used as a flueric square-root circuit. For example in FIGURE 2, the input to the summing point would be taken from $P_A$. $P_B$ would be taken as the output.

I claim:
1. A fluid-operated computer comprising:
    (a) a fluid bridge circuit including:
        (1) a first substantially linear fluid resistance,
        (2) a first orifice means connected in series with said first resistance, the junction therebetween defining a first pressure-controllable point,
        (3) a second orifice means having substantially the same operational characteristics as said first orifice means,
        (4) a second substantially linear fluid resistance having substantially the same operational characteristics as said first resistance connected in series with said second orifice means, the junction therebetween defining a second pressure-controllable point,
    (b) a fluid pressure amplifier connected to one of said pressure-controllable points to receive a feedback signal, the output of said amplifier being connected to supply said first resistance and said second orifice means,

(c) signal input means connected to said amplifier for supplying an input signal thereto, said feedback signal being substantially equal to said input signal, and
(d) signal output means connected to the other of said pressure-controllable points.

2. A computer according to claim 1 wherein said amplifier is connected to said second pressure-controllable point, and said signal output means is connected to said first pressure-controllable point.

3. A fluid-operated computer comprising:
(a) a fluid bridge circuit including:
(1) a first substantially linear fluid resistance,
(2) a first orifice means connected in series with said first resistance, the junction therebetween defining a first pressure controllable point,
(3) a second orifice means having substantially the same operational characteristics as said first orifice means,
(4) a second substantially linear fluid resistance having substantially the same operational characteristics as said first resistance connected in series with said second orifice means, the junction therebetween defining a second pressure-controllable point,
(b) a fluid pressure amplifier connected to said second pressure-controllable point through said second fluid resistance to receive a feedback signal, said second fluid resistance comprising at least part of the compensated input fluid resistance of one channel of said amplifier, the output of said amplifier being connected to supply said first resistance and said second orifice means,
(c) signal input means connected to said amplifier for supplying an input signal thereto, said feedback signal being substantially equal to said input signal, and
(d) signal output means connected to said first pressure-controllable point.

4. A computer according to claim 3 further comprising:
(a) a third orifice means connected between said signal input means and the feedback input to said amplifier for compensating for the nonlinearities of the input impedance of said amplifier, and
(b) flow generator means connecting the feedback input to said amplifier for compensating for the entrainment of fluid when the power jet of said amplifier is turned on.

References Cited
UNITED STATES PATENTS
3,250,469  5/1966  Colston _____ 235—200

RICHARD B. WILKINSON, Primary Examiner

LAWRENCE R. FRANKLIN, Assistant Examiner